US012647364B2

(12) United States Patent
Du et al.

(10) Patent No.: US 12,647,364 B2
(45) Date of Patent: Jun. 2, 2026

(54) LOAD BALANCING METHOD, APPARATUS, AND SYSTEM

(71) Applicant: HUAWEI TECHNOLOGIES CO., LTD., Shenzhen (CN)

(72) Inventors: Zhibin Du, Shanghai (CN); Jianjun Guo, Shanghai (CN); Chao Meng, Shanghai (CN); Haifeng Yu, Shanghai (CN); Zhonghua Hu, Shenzhen (CN); Fengkai Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 327 days.

(21) Appl. No.: 18/152,407

(22) Filed: Jan. 10, 2023

(65) Prior Publication Data

US 2023/0164080 A1     May 25, 2023

Related U.S. Application Data

(63) Continuation of application No. PCT/CN2021/094052, filed on May 17, 2021.

(30) Foreign Application Priority Data

Jul. 17, 2020    (CN) ......................... 202010689474.7
Sep. 11, 2020    (CN) ......................... 202010956127.6

(51) Int. Cl.
*G06F 15/173*     (2006.01)
*H04L 47/10*      (2022.01)
*H04L 47/125*     (2022.01)

(52) U.S. Cl.
CPC ............ *H04L 47/125* (2013.01); *H04L 47/18* (2013.01)

(58) Field of Classification Search
None
See application file for complete search history.

(56) References Cited

U.S. PATENT DOCUMENTS

| | | | |
|---|---|---|---|
| 9,871,712 B1 * | 1/2018 | Sorenson, III | .......... H04L 43/10 |
| 10,574,577 B1 * | 2/2020 | Matthews | ............. H04L 47/125 |
| 11,481,361 B1 * | 10/2022 | Dhoke | ................ G06F 16/1844 |
| 2016/0094643 A1 * | 3/2016 | Jain | ......................... H04L 45/24 |
| | | | 709/226 |
| 2017/0171084 A1 | 6/2017 | Hao et al. | |
| 2017/0324664 A1 * | 11/2017 | Xu | ...................... H04L 12/4633 |
| 2019/0104206 A1 | 4/2019 | Goel et al. | |
| 2020/0234582 A1 * | 7/2020 | Mintz | ............. G08G 1/096811 |

FOREIGN PATENT DOCUMENTS

| | | |
|---|---|---|
| CN | 107819695 A | 3/2018 |
| CN | 108540876 A | 9/2018 |
| CN | 106411733 B | 5/2019 |

* cited by examiner

*Primary Examiner* — Phuoc H Nguyen

(57) ABSTRACT

A load balancing system implemented in a data center network (DCN) includes a controller and a server. The controller generates topology information of the DCN based on information about a network node in the DCN, and sends the topology information to the server. The server obtains a data flow and selects a forwarding path corresponding to the data flow from a plurality of load balancing paths, wherein the plurality of load balancing paths are generated based on the topology information.

20 Claims, 15 Drawing Sheets

S401. Collect information about network nodes in a data center network

S402. Generate topology information of the data center based on the information and send the topology information to a server S403. The server generates a plurality of load balancing paths based on the topology information S404. The server obtains a data flow, and selects a forwarding path corresponding to the data flow from the plurality of load balancing paths Layer 2: spine switches Layer 1: leaf switches Servers

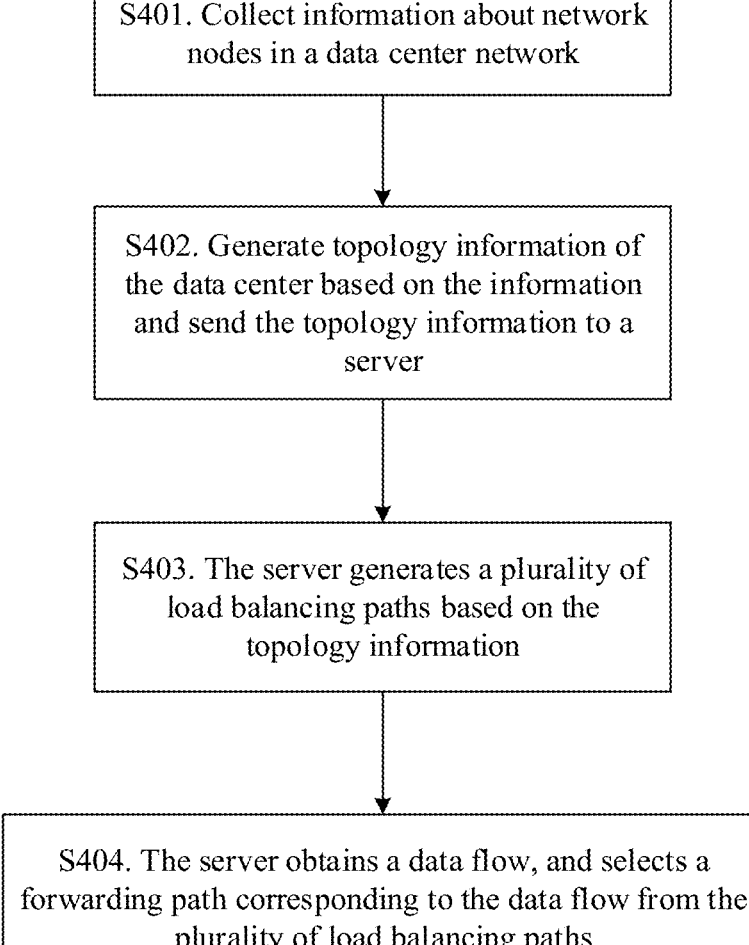

S401. Collect information about network nodes in a data center network

S402. Generate topology information of the data center based on the information and send the topology information to a server S403. The server generates a plurality of load balancing paths based on the topology information S404. The server obtains a data flow, and selects a forwarding path corresponding to the data flow from the plurality of load balancing paths

FIG. 4

| Path identifier | Destination server identifier | First hop | Second hop | Third hop | Fourth hop | Fifth hop |
|---|---|---|---|---|---|---|
| 1 | 1 | P11 | 5 | 2 | 2 | 1 |
| 2 | 1 | IP2 | 7 | 4 | 4 | 3 |
| ... | ... | ... | ... | ... | ... | ... |
| 14 | 2 | MAC17 | 1 | 18 | 3 | 11 |
| 15 | 2 | P12 | 7 | 32 | 5 | 20 |
| ... | ... | ... | ... | ... | ... | ... |

Deployable
forwarding node set

Step

Random start

Controller

Packet_out
DPID: 001
Outgoing port ID: 2

S1010

Packet_in
DPID: 001
Outgoing port ID: 2

S1012

DPID: 001
Outgoing port ID: 2

OpenFlow node 1
(DPID: 001)

S1011

OpenFlow node 2
(DPID: 002)

1110

| Path identifier | First hop | Second hop | Third hop | Fourth hop | Fifth hop |
|---|---|---|---|---|---|
| M1 | IP1 | IP2 | IP3 | IP4 | IP5 |

1120

| IPv6 | SA: IP0<br>DA: IP6 |
|---|---|
| SRH<br>SL: 3 | IP5 |
| | IP4 |
| | IP3 |
| | IP2 |
| | IP1 |
| Flow segment | |

FIG. 11

LOAD BALANCING METHOD, APPARATUS, AND SYSTEM

CROSS-REFERENCE TO RELATED APPLICATIONS

This application is a continuation of International Patent Application No. PCT/CN2021/094052, filed on May 17, 2021, which claims priority to Chinese Patent Application No. 202010689474.7, filed on Jul. 17, 2020, and Chinese Patent Application No. 202010956127.6, filed on Sep. 11, 2020. All of the aforementioned priority patent applications are hereby incorporated by reference in their entirety.

TECHNICAL FIELD

The present invention relates to the field of network communications technologies, and in particular, to a load balancing method, an apparatus, and a system.

BACKGROUND

With increase of service requirements, a quantity of switching nodes in a data center network (DCN) increases drastically. To fully use forwarding capabilities of the switching nodes, the DCN provides a plurality of paths for an upper-layer application to implement load balancing. Load balancing algorithms used currently are mostly equal-cost multi-path (ECMP) technologies.

FIG. 1 is a schematic diagram of a process of forwarding a data flow by using an existing load balancing technology, which is applied to a data center network 100. The data center network 100 includes an access layer including an access node, an aggregation layer including an aggregation node, and a core layer including a spine node. A server is connected to a corresponding access node. A point of delivery (POD) is used as a basic design unit in the data center network 100. The data center network includes a plurality of pods (for example, a pod 1 to a pod 32). Different pods communicate with each other by using a spine set (spine set). Each spine set includes a plurality of spine (spine) nodes. Each pod includes a plurality of access nodes (for example, access nodes T1 to T32), a plurality of aggregation nodes (for example, aggregation nodes L1 to L4), and a server connected to an access node. A server 1 in the pod 1 includes two egress ports P1 and P2. Four static forwarding paths F1 to F4 exist between the server 1 in the pod 1 and a server 2 in the pod 32. F1 to F3 correspond to the egress port P1, and F4 corresponds to the egress port P2. When P1 and P2 each have 1 G bandwidth left, and two data flows whose rates are respectively 600 Mbps and 1.2 Gbps need to be forwarded to the server 2 in the pod 32, the server 1 in the pod 1 selects two forwarding paths F3 and F4 by using an ECMP algorithm such as hashing or round-robin. In this case, bandwidth at the egress port P1 is surplus because F3 forwards the data flow of 600 Mbps, but the egress port P2 is congested because F4 forwards the data flow of 1.2 Gbps.

It can be learned that the ECMP technology implements traffic balancing hop-by-hop (hop-by-hop) and considers only local balancing. When servers in the data center network send data flows by using corresponding access nodes, data flows of different servers may be all forwarded to a same aggregation node, for example, L2. When a plurality of data flows all pass the aggregation node, a forwarding capability of the aggregation node is exceeded, resulting in single node congestion in the network.

SUMMARY

This application provides a load balancing method, an apparatus, and a system, which are applied to a DCN. In this application, a server accurately calculates an end-to-end load balancing path, thereby improving load balancing efficiency of an entire data center network. This application is defined by the claims.

According to a first aspect, this application discloses a load balancing method, applied to a server in a data center network. The server obtains topology information of the data center network. The topology information includes an identifier of a network node in the data center network and a connection relationship between the network node and a neighboring node in the data center network. The server obtains a data flow; and selects a forwarding path corresponding to the data flow from a plurality of load balancing paths.

In this application, the server determines a load balancing path based on the topology information of the data center network. In this way, a running status of all network nodes in the entire data center network is considered, thereby reducing a possibility of a load balancing path conflict and improving load balancing efficiency of the entire data center network.

In an optional implementation, the plurality of load balancing paths are determined by the server based on the topology information before the data flow is obtained or after the data flow is obtained.

After the data flow is obtained, the server segments the data flow, to obtain a plurality of flow segments; and selects, from the plurality of load balancing paths, a corresponding forwarding path for each of the plurality of flow segments. By using this method, different flow segments of the same data flow may be forwarded simultaneously on a plurality of load balancing paths, thereby improving forwarding efficiency of the data flow.

In an optional implementation, before determining the plurality of load balancing paths, the server further determines a first weight between the server and a destination server based on the topology information. For example, the server calculates a second weight between an intermediate node and the destination server by using a backpropagation algorithm, where the intermediate node is between the server and the destination server; and determines the first weight between the server and the destination server based on the second weight of the intermediate node. The server may obtain all effective forwarding paths to the destination server by using the first weight. This is convenient for the server to select the plurality of load balancing paths from all the effective forwarding paths.

Further, in an optional implementation, the intermediate node includes a plurality of first-hop nodes connected to the server, and a plurality of second-hop nodes. When the plurality of load balancing paths are determined, the server selects a first-hop node from the plurality of first-hop nodes as a first hop of a first load balancing path based on a second weight of at least one of the plurality of first-hop nodes, where the first load balancing path is any one of the plurality of load balancing paths; and selects a second-hop node as a second hop of the first load balancing path based on a second weight of at least one of the plurality of second-hop nodes, or selects a second-hop node from the plurality of second-hop nodes as a second hop of the first load balancing path in a random, round-robin, or step-based manner. The server determines a load balancing path in this manner. This can reduce a possibility that the load balancing path overlaps with a load balancing path determined by another server, thereby reducing a probability of a data flow forwarding conflict.

In an optional implementation, the first weight includes one or more of path history information, network status information, or a quantity of connected effective paths between the server and the destination server, and the network status information includes one or more of network congestion, packet loss, port bandwidth, rerouting, or fault information. The second weight includes information corresponding to the first weight. For example, the second weight includes one or more of path history information, network status information, or a quantity of connected effective paths between the intermediate node and the destination server, and the network status information includes one or more of network congestion, packet loss, port bandwidth, rerouting, or fault information. A load balancing path is determined by using the first weight and the second weight. This fully considers a running status of the entire data center network, thereby improving load balancing efficiency.

In an optional implementation, the server regenerates a load balancing path based on updated topology information of the data center network when it is detected that a faulty network node recovers to normal after a quantity of faulty network nodes in the data center network reaches or exceeds a threshold. Further, in an optional implementation, the updated topology information of the data center network includes node status change information, and the node status change information includes information indicating that a network node in the data center network is faulty or information indicating that a faulty network node in the data center network recovers to normal. In this way, the server does not redetermine a load balancing path immediately after the topology information of the data center network is changed, thereby reducing a calculation workload of the server.

In an optional implementation, when a burst flow is detected, the server generates an incremental load balancing path based on the topology information, and sends the burst flow based on the incremental load balancing path. Further, in an optional implementation, the server deletes the incremental load balancing path after forwarding of the burst flow is completed. Forwarding of the burst flow in this manner does not impact services carried on an original data flow, so that quality of service (QoS) of these services is not compromised. In addition, the incremental load balancing path is deleted after sending of the burst flow is completed, thereby reducing a workload of a forwarding node of the data center network.

In an optional implementation, the server receives the topology information sent by a controller in the data center network. The topology information is generated by the controller based on a topology model parameter and information about the network node in the data center network. By using this method, the server in the data center network does not need to generate the topology information of the entire data center network. In addition, the server generates a load balancing path based on the topology information, thereby improving load balancing efficiency.

In an optional implementation, the topology model parameter includes a networking mode of the data center network and/or a dual-homing attribute of the network node.

In this way, the controller can flexibly generate topology information of a data center based on a physical topology of the data center network.

In an optional implementation, the information about the network node includes information about the server, and the information about the server is sent to the controller by using a first-hop node connected to the server. Information about servers far more than first-hop nodes in quantity is sent to the controller by using the first-hop nodes. This reduces a quantity of interactions between the servers and the controller, thereby improving working efficiency of the controller.

According to a second aspect, this application discloses a server. The server includes function modules configured to implement the load balancing method according to any one of the first aspect or possible designs of the first aspect. Division of the function modules is not limited in this application. The function modules may be correspondingly divided based on procedure steps of the load balancing method according to the first aspect, or the function modules may be divided based on a specific implementation requirement.

According to a third aspect, this application discloses another server, applied to a data center network. The server includes at least one communications interface, a memory, and a processor. The communications interface is configured to communicate with an external device. For example, one communications interface is configured to send information about the server to a controller and receive topology information of the data center network from the controller. For another example, another communications interface is configured to send a data flow to a forwarding node in the data center network. The memory is configured to store program code. The processor is configured to execute the program code to enable the server to implement the load balancing method according to any one of the first aspect or possible designs of the first aspect.

According to a fourth aspect, this application discloses a load balancing system, which is applied to a data center network and includes a server and a controller. The server is the server disclosed in the second aspect or the third aspect. The controller collects information about a network node in the data center network, generates topology information of the data center network based on a topology model parameter and the information about the network node, and then sends the topology information to the server, so that the server performs the method according to the first aspect and the implementations of the first aspect.

According to a fifth aspect, this application discloses computer program code. When instructions included in the computer program code are executed by a computer, the computer is enabled to implement the load balancing method according to any one of the first aspect or the possible implementations of the first aspect.

According to a sixth aspect, this application discloses a computer-readable storage medium. The computer-readable storage medium stores computer program instructions. When the computer program instructions are run on a computer, the computer is enabled to perform the load balancing method according to any one of the first aspect or the possible implementations of the first aspect.

For beneficial effects of the second to the sixth aspects of this application, refer to the first aspect and the implementations of the first aspect.

BRIEF DESCRIPTION OF DRAWINGS

FIG. 4 is a schematic flowchart of a load balancing method according to an embodiment of this application;

FIG. 8 is a load balancing path list according to an embodiment of this application;

FIG. 11 is a schematic diagram of a data flow sending method according to an embodiment of this application.

DESCRIPTION OF EMBODIMENTS

To make a person skilled in the art understand the solutions in this application better, the following clearly describes the technical solutions in embodiments of this application with reference to the accompanying drawings in embodiments of this application. It is clear that described embodiments are merely some but not all of embodiments of this application.

In embodiments of this application, the word "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the terms such as "example" or "for example" is intended to present a related concept in a specific manner. In embodiments of this application, unless otherwise stated, "a plurality of" means two or more than two. For example, a plurality of nodes mean two or more nodes. "At least one" means any quantity, for example, one, two, or more than two. "A and/or B" may represent that only A exists, only B exists, or both A and B are included. "At least one of A, B, and C" may represent that only A exists, only B exists, only C exists, A and B are included, B and C are included, A and C are included, or A, B, and C are included. In this application, terms such as "first" and "second" are merely used for distinguishing between different objects, but are not used to indicate priorities or importance of the objects.

Figure 2A:
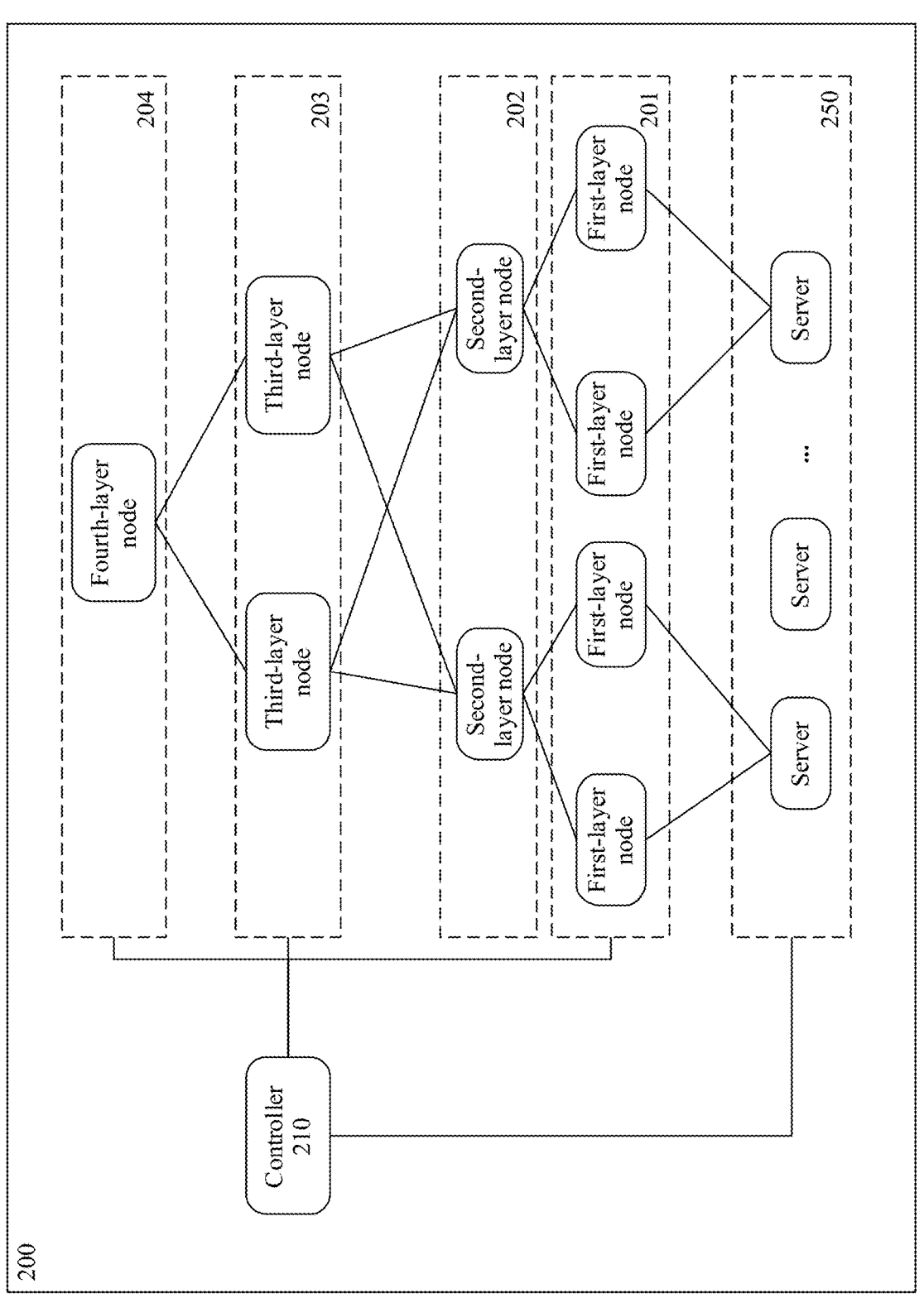
FIG. 2A is a schematic diagram of a structure of a load balancing system according to an embodiment of this application.

To reduce forwarding path conflicts and improve load balancing efficiency of a data center network, in an implementation, as shown in FIG. 2A, a load balancing system 200 is provided. The load balancing system 200 includes a controller 210, a server 250, and k layers of forwarding nodes, for example, a first-layer forwarding node 201, a second-layer forwarding node 202, a third-layer forwarding node 203, and a fourth-layer forwarding node 204. Forwarding node layers vary with a networking mode of the data center network. When the data center network uses networking shown in FIG. 3A, the load balancing system 200 includes three layers (k=3) of forwarding nodes, for example, a first-layer forwarding node 201, a second-layer forwarding node 202, and a third-layer forwarding node 203. When a networking mode of the data center network is two-layer networking shown in FIG. 3B, the load balancing system 200 includes two layers (k=2) of forwarding nodes, for example, a first-layer forwarding node 201 and a second-layer forwarding node 202. In this case, the first-layer forwarding node 201 may be a leaf switch, and the second-layer forwarding node 202 may be a spine switch. When the data center network uses networking shown in FIG. 3C, the load balancing system 200 includes four layers (k=4) of forwarding nodes, for example, a first-layer forwarding node 201, a second-layer forwarding node 202, a third-layer forwarding node 203, and a fourth-layer forwarding node 204. The first-layer forwarding node 201 may be a leaf switch, the second-layer forwarding node 202 may be a spine switch, the third-layer forwarding node 203 may be a core switch, and the fourth-layer forwarding node 204 may be a fabric adapter (FA). In a scenario shown in FIG. 3C, each physical data center (also referred to as a region), for example, a data center 1 or a data center N, may include a first-layer forwarding node 201, a second-layer forwarding node 202, and a third-layer forwarding node 203. The fourth-layer forwarding node 204 communicates with third-layer forwarding nodes 203 across a plurality of physical data centers. Therefore, in this application, the data center network is only a logical concept. The data center network may be deployed in one physical data center, or may be deployed across a plurality of physical data centers. This is not limited in this application. In addition, a quantity of layers of forwarding nodes is not limited in this application. Based on a scale of the data center network, the data center network may have five layers, six layers, or more layers. For ease of description, the load balancing system 200 and a corresponding method and apparatus are described subsequently in this application by using a three-layer networking mode as an example. Therefore, the load balancing system 200 may be shown in FIG. 2B. When the data center network uses three-layer networking, the first-layer forwarding node 201 is usually an access node, for example, a top-of-rack (ToR) switch. The second-layer forwarding node 202 is usually an aggregation node, for example, a leaf (leaf) switch. The third-layer forwarding node 203 is usually a core node, for example, a spine (spine) switch or a spine set (spine set) including a spine switch. In this application, FIG. 2B uses a top-of-rack (ToR) node 220, a leaf (leaf) node 230, and a spine (spine) node 240 as specific implementations of the first-layer forwarding node 201, the second-layer forwarding node 202, and the third-layer forwarding node 203, respectively. In actual deployment, a forwarding node may be a physical switch or a virtual switch. In addition, in this application, a node may also be referred to as a network device.

Figure 3A:
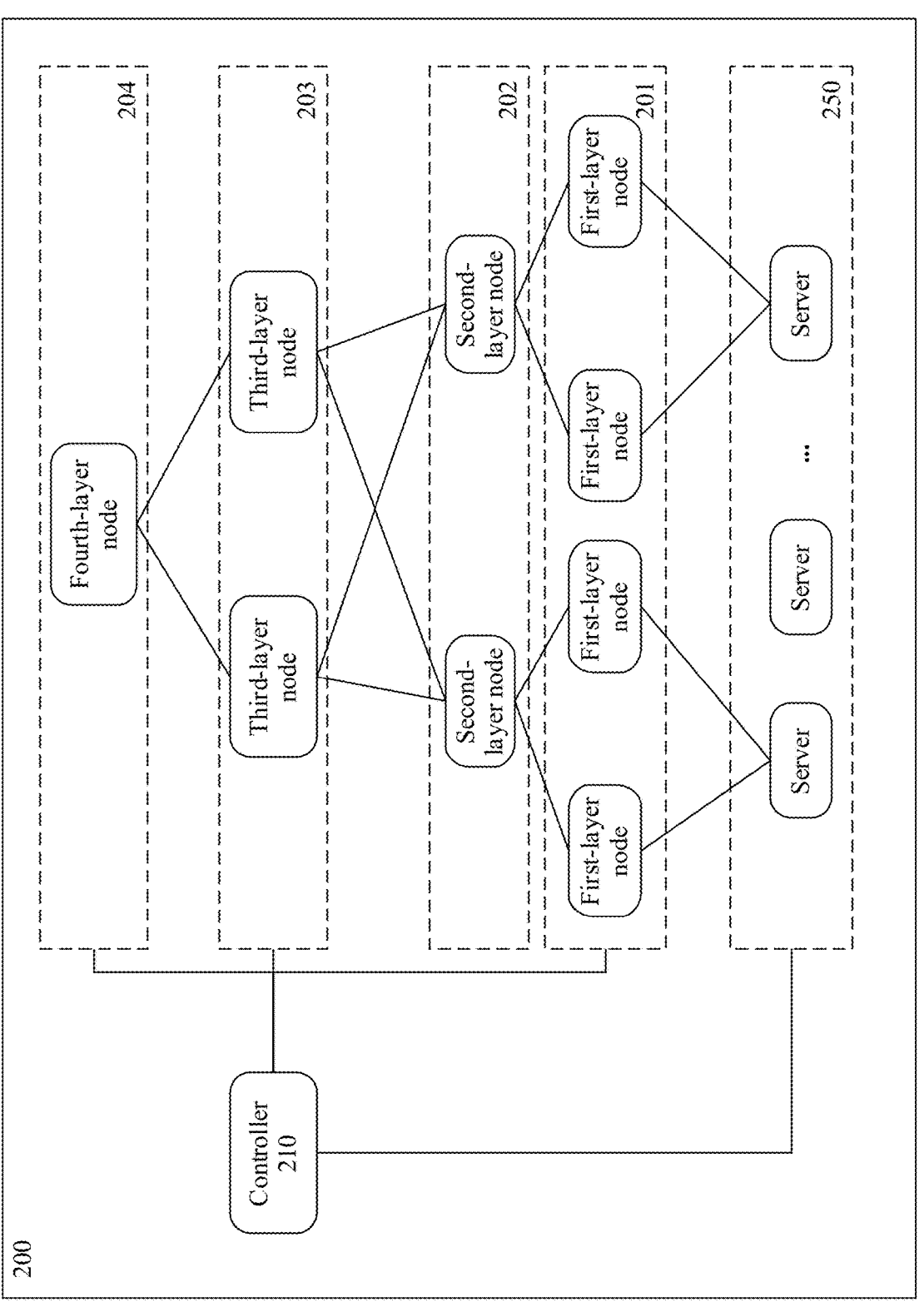
FIG. 3A is a schematic diagram of a structure of three-layer clos networking according to an embodiment of this application.

The controller 210 is connected to the spine node 240, the leaf node 230, the ToR node 220, and the server 250 in the DCN. A manner of connection between the spine node 240, the leaf node 230, the ToR node 220, and the server 250 varies with a networking mode. For example, FIG. 3A is a schematic diagram of a structure of a three-layer clos networking mode. A plurality of pods 300, for example, a pod 1 and a pod 2, are connected to each other by using a spine (spine) node in a third-layer spine set 340. A plurality of (for example, 32) spine nodes form a spine set. Each pod includes a plurality of (for example, 128) servers 310, a plurality of (for example, 32) first-layer top-of-rack nodes 320, and a plurality of (for example, 8) second-layer leaf nodes 330. A pod 300 is connected to a spine set. To be specific, a leaf node in the pod 300 is connected to only a spine node in one spine set 340. A server 310 is simultaneously connected to downlink ports (that is, server-facing interfaces) of two ToR nodes 320, to form a dual-homing ToR. The dual-homing ToR is a network topology. To be specific, a server has two independent egress ports and is connected to two independent ToR nodes through the two egress ports. When forwarding data, the server may use an active-standby (active-standby) mode, in which one egress port is set as an active connection and the other egress port is set as a standby connection. In this manner, in a normal case, only the egress port in an active state can forward a data flow. When the egress port in the active state is faulty, the standby egress port automatically takes over forwarding of the data flow. Alternatively, an active-active (active-active) mode may be set. In this mode, a data flow may be forwarded through the two egress ports at a same moment. In this application, a data flow includes consecutive packets with a same destination address. Formats of these packets may be the same or different. Reliability of a connection between the server and the ToR nodes can be enhanced by using the dual-homing ToR. An uplink port (that is, a network side-facing interface) of a ToR node 320 is in full connection with leaf nodes 330. In other words, one ToR node is simultaneously connected to all leaf nodes in the pod. A downlink port of a leaf node 330 is in full connection with ToR nodes. In other words, one leaf node is connected to all the ToR nodes in the pod. An uplink port of a leaf node is in group connection with spine nodes in a spine set 340. In other words, a leaf node in a pod is connected to only spine nodes in one spine set, and different uplink ports of the leaf node are connected to different spine nodes in the spine set.

Figure 2B:
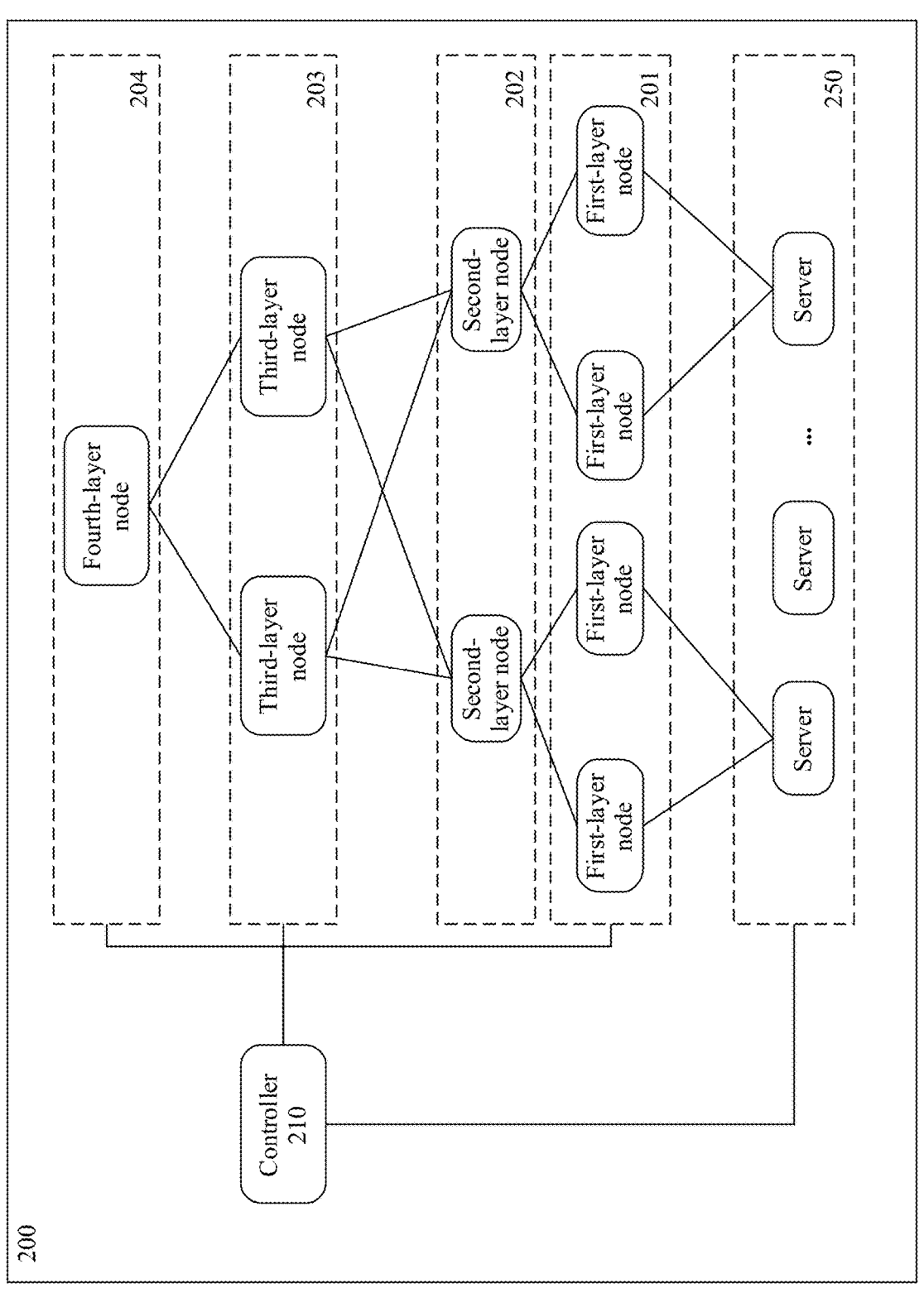
FIG. 2B is a schematic diagram of a structure of another load balancing system based on clos networking according to an embodiment of this application.
Figure 3B:
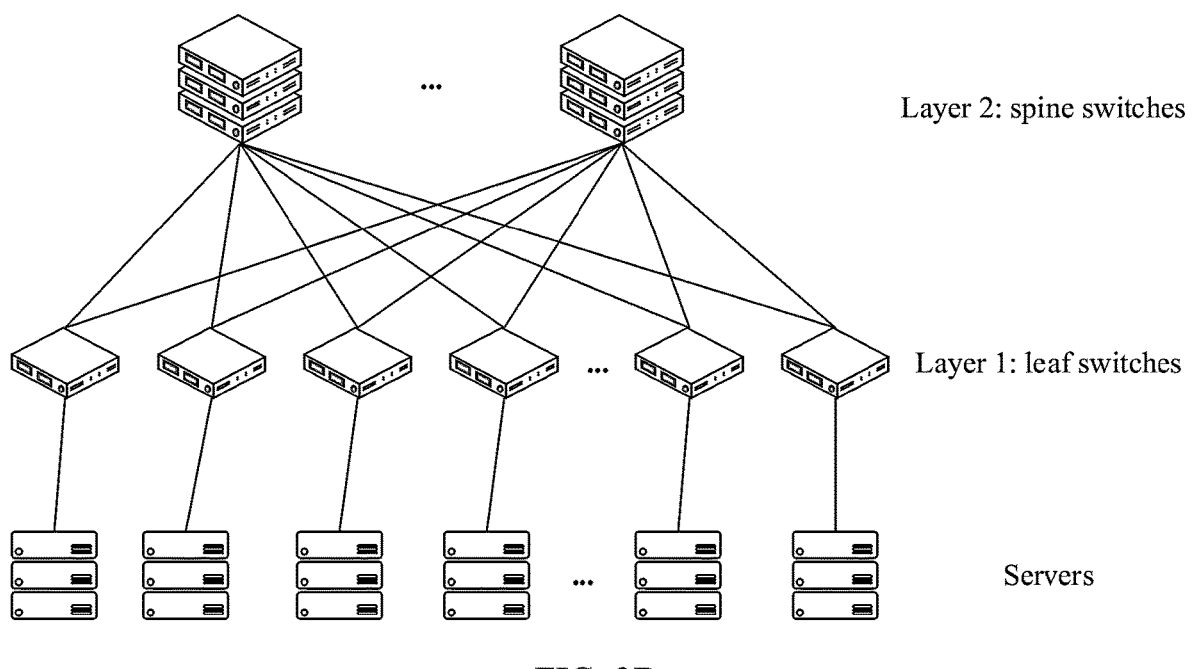
FIG. 3B is a schematic diagram of a structure of two-layer networking according to an embodiment of this application.
Figure 3C:
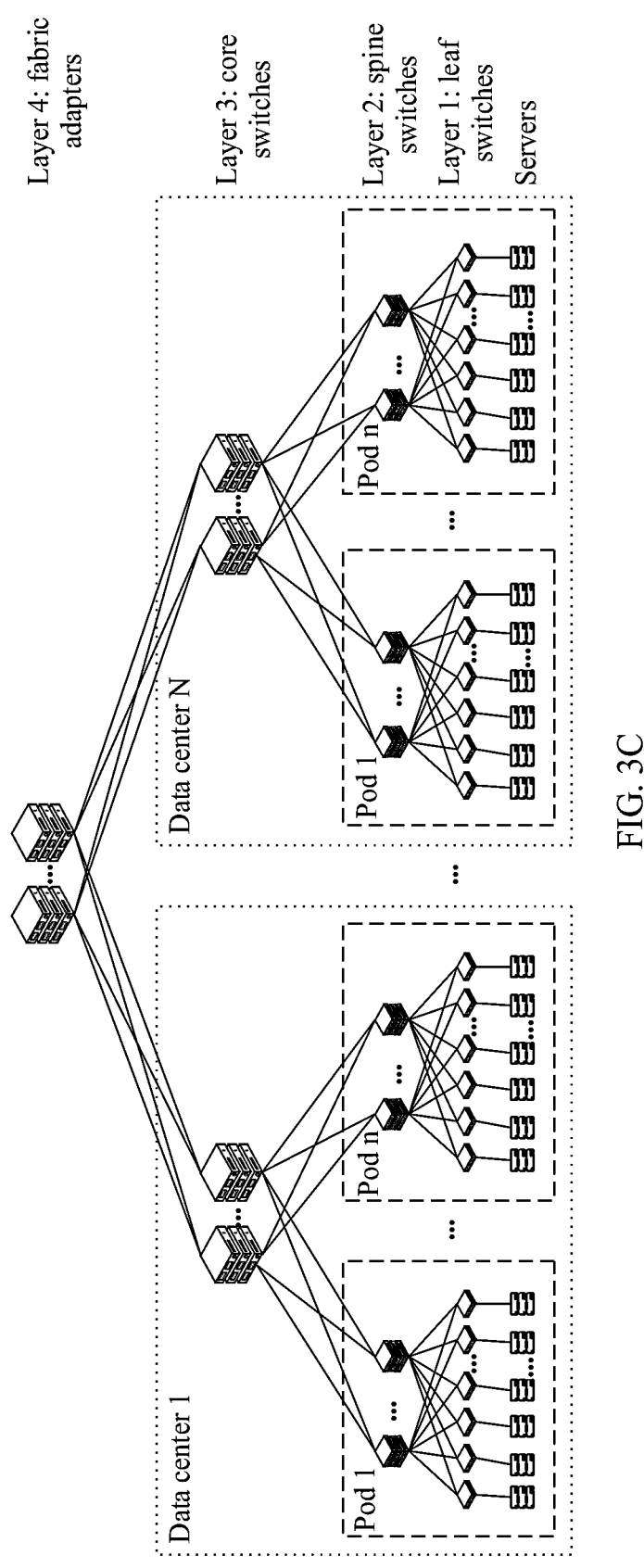
FIG. 3C is a schematic diagram of a structure of four-layer networking according to an embodiment of this application.

A load balancing method shown in FIG. 4 may be performed in the load balancing system 200 shown in FIG. 2B.

In step S401, a controller collects information about network nodes in a data center network. The network nodes include a server 250 and a plurality of layers of forwarding nodes, for example, a top-of-rack node 220, a leaf node 230, and a spine node 240. When the data center network uses four-layer networking, the network nodes further include a fourth-layer node 204.

In this application, a controller 210 may collect node information by interacting with the forwarding nodes in the DCN by using a Link Layer Discovery Protocol (LLDP). For example, the ToR node 220, the leaf node 230, and the spine node 240 may obtain a type-length-value (TLV) including node information and link information of the nodes and neighboring nodes, encapsulate the TLV in an LLDPDU of an LLDP packet, and send the LLDP packet to the controller 210 periodically or as needed. The node information includes a node identifier, a configuration, a performance parameter, and the like. The link information may be a port identifier, a configured IP address, remaining bandwidth, information about a connected upstream node and downstream node, and the like. A quantity of servers 250 is far greater than a quantity of forwarding nodes. Therefore, to reduce load of the controller 210, information about a server 250, including node information, link information, and/or the like, is not directly sent by the server 250 to the controller 210, but is first sent to a ToR node 220 directly connected to the server 250. After receiving the information, the ToR node 220 may first store the information in a management information base (MIB), and then encapsulate both the information about the server 250 and information about the ToR node 220 in an LLDP packet. The ToR node 220 sends the LLDP packet to the controller 210.

Figures 9, 10A:
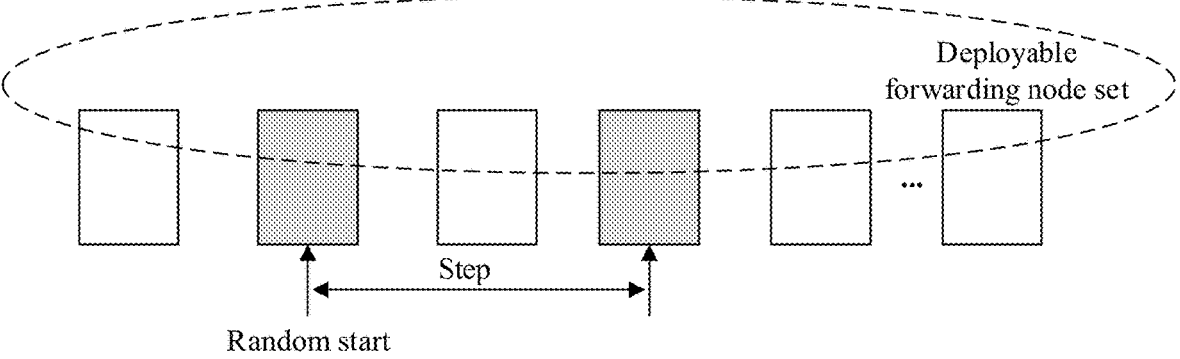
FIG. 9 is a schematic diagram of a second path calculation method according to an embodiment of this application.
FIG. 10A is a schematic diagram of a topology information collection method according to an embodiment of this application.

In another implementation, the controller 210 may further collect node topology information by using LLDP in combination with another protocol such as an OpenFlow protocol. As shown in FIG. 10A, a controller 210 may be a software-defined networking (SDN) controller. An OpenFlow node 1 or an OpenFlow node 2 is one of the spine node 240, the leaf node 230, and the ToR node 220 in FIG. 2B. In an SDN network, the ToR node 220, the leaf node 230, and the spine node 240 may further be identified by using an OpenFlow datapath ID (DPID). The controller 210 communicates with an OpenFlow node by using the OpenFlow protocol, and collects network node information by using the following steps:

In step S1010, the controller 210 delivers an LLDP packet to the OpenFlow node 1 by using a packet_out message, where the LLDP packet includes an ID of an egress port for forwarding the LLDP packet.

In step S1011, after receiving the LLDP packet, the OpenFlow node 1 adds, to the LLDP packet, information that needs to be reported (including information about the OpenFlow node 1, a server connected to the OpenFlow node 1, and a neighboring node, where the information includes node information, link information, and/or the like); and sends, through an egress port with a specified ID, the LLDP packet to the OpenFlow node 2 connected to the OpenFlow node 1.

In step S1012, after receiving the LLDP packet, the OpenFlow node 2 also adds, to the LLDP packet, information that needs to be reported (including information about the OpenFlow node 2, a server connected to the OpenFlow node 2, and a neighboring node, where the information includes node information, link information, and/or the like); and sends the LLDP packet to the controller 210 by using a packet_in message. In this way, the controller 210 completes collection of information about all network nodes in the DCN.

Figure 10B:
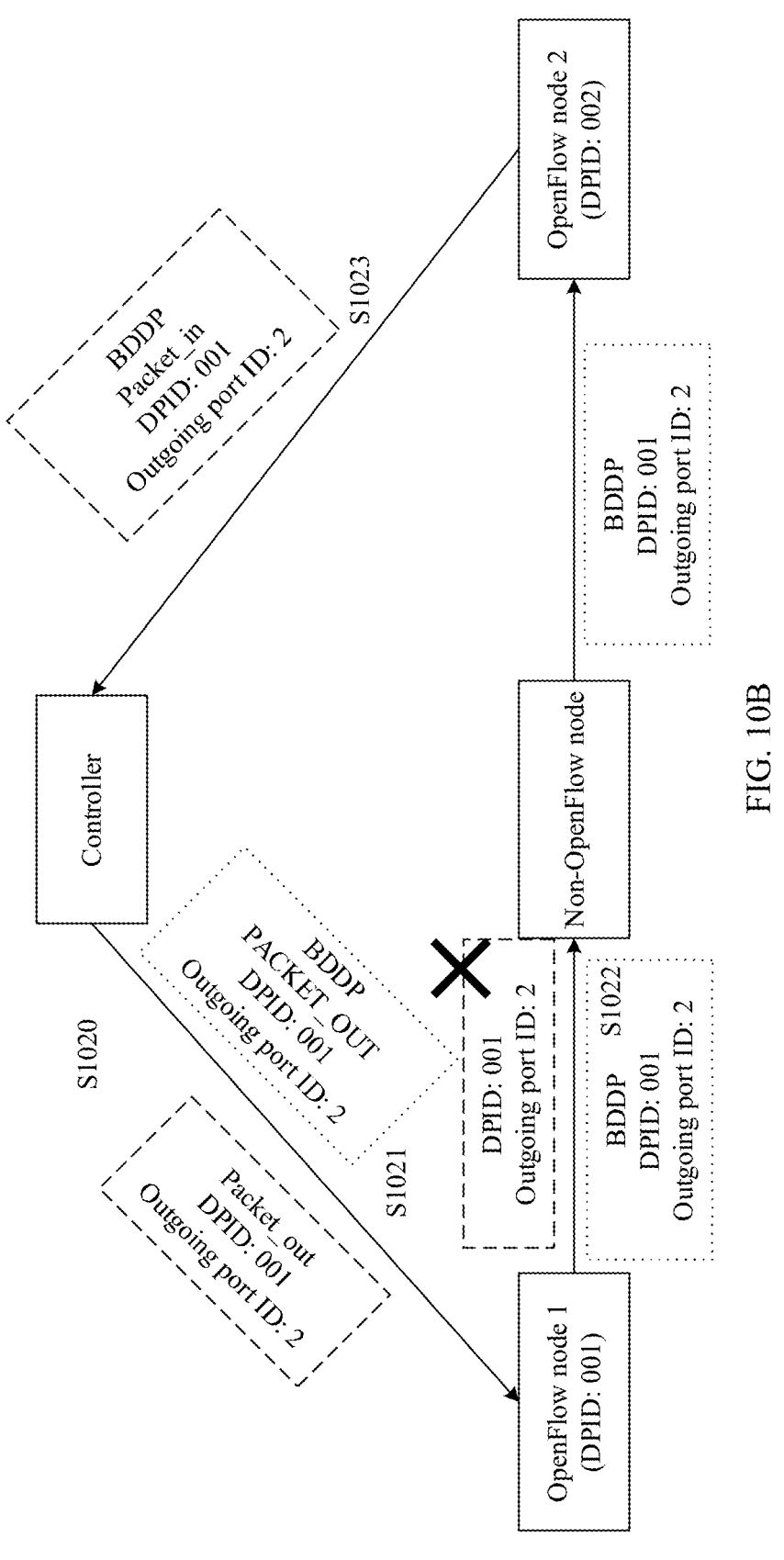
FIG. 10B is a schematic diagram of another topology information collection method according to an embodiment of this application.

In another implementation, the controller 210 may alternatively collect topology information in combination with another protocol, for example, a broadcast domain discovery protocol (BDDP). As shown in FIG. 10B, when a non-OpenFlow node, besides an OpenFlow node, further exists in a DCN, node topology information may alternatively be collected in the following manner:

In step S1020, a controller 210 delivers an LLDP packet to an OpenFlow node 1 by using a packet_out message. A packet_in message corresponding to the LLDP packet is not returned within a specified time. Therefore, the controller 210 can determine that a non-OpenFlow node exists in the DCN.

Therefore, in step S1021, the controller 210 sends a BDDP packet to the OpenFlow node 1 by using a packet_out message, where the BDDP packet includes an LLDP packet.

In step S1022, after receiving the BDDP packet, the OpenFlow node 1 adds, to the LLDP packet in the BDDP packet, information that needs to be reported (including information about the OpenFlow node 1, a server connected to the OpenFlow node 1, or a neighboring node, where the information includes node information, link information, and the like); and broadcasts the BDDP packet to the non-OpenFlow node through a specified egress port, where the BDDP packet finally arrives at an OpenFlow node 2 connected to the non-OpenFlow node.

In step S1023, the OpenFlow node 2 adds, to the LLDP packet in the BDDP packet, information that needs to be reported (including information about the OpenFlow node 2, a server connected to the OpenFlow node 2, a neighboring node, where the information includes node information, link information, and the like); and sends the BDDP packet to the controller 210 by using a packet in message. In this way, the controller 210 completes collection of information about all network nodes in the DCN.

The foregoing implementations of this application describe how the controller 210 collects the information about all the network nodes in the DCN by using the LLDP protocol only or in combination with a BDDP or OpenFlow protocol. The controller 210 may alternatively collect information about the network nodes by using another protocol. This is not limited in this application.

In step S402, the controller generates topology information of the data center network based on the received information about the network nodes in the data center network.

In this application, after collecting the information about the network nodes in the data center network, the controller 210 generates the topology information of the data center network based on the information. In an implementation, the controller generates the topology information of the data center network based on a configured topology model parameter. The topology model parameter may be one or a combination of a networking mode, a dual-homing ToR attribute, and the like. The dual-homing attribute indicates a mode of operation of a dual-homing ToR, for example, an active-active mode or an active-standby mode. Depending on different scales, the data center network may use a networking mode in which two layers, three layers, four layers, or even more layers are deployed. In addition, even networking modes in which a same quantity of layers are deployed are different based on different manners of connection between the layers. For example, three-layer networking modes may be divided into clos networking and mesh networking based on different manners of connection between a second-layer forwarding node and a third-layer forwarding node. A difference between mesh networking and clos networking lies in that in clos networking, the leaf node 230 and the spine node 240 are in group connection; but in mesh networking, the leaf node 230 and the spine node 240 are in full connection. A networking mode (including layers of forwarding nodes, a manner of connection between the layers of nodes, and the like) is determined during physical deployment of a data center (DC). Therefore, when a load balancing system is deployed, a networking mode corresponding to the load balancing system further needs to be set. The controller 210 generates the topology information of the data center network based on the networking mode that is set. After generating the topology information of the data center network, the controller 210 distributes the topology information of the data center network to the server 250. The generated topology information includes identifiers of the network nodes (including the server) in the data center network, a connection relationship between the network nodes and a neighboring node in the data center network, and the like. The topology information may further include one or more of a quantity of forwarding nodes at each layer, a manner of connection, a capability of the network nodes, and the like in the data center network.

In the example in the foregoing steps S401 and S402, the topology information of the data center network is collected by the controller. In actual deployment, topology information of a data center may alternatively be collected by the server or a network management system.

In step S403, the server 250 generates a plurality of load balancing paths based on the topology information of the data center network.

Figure 1:
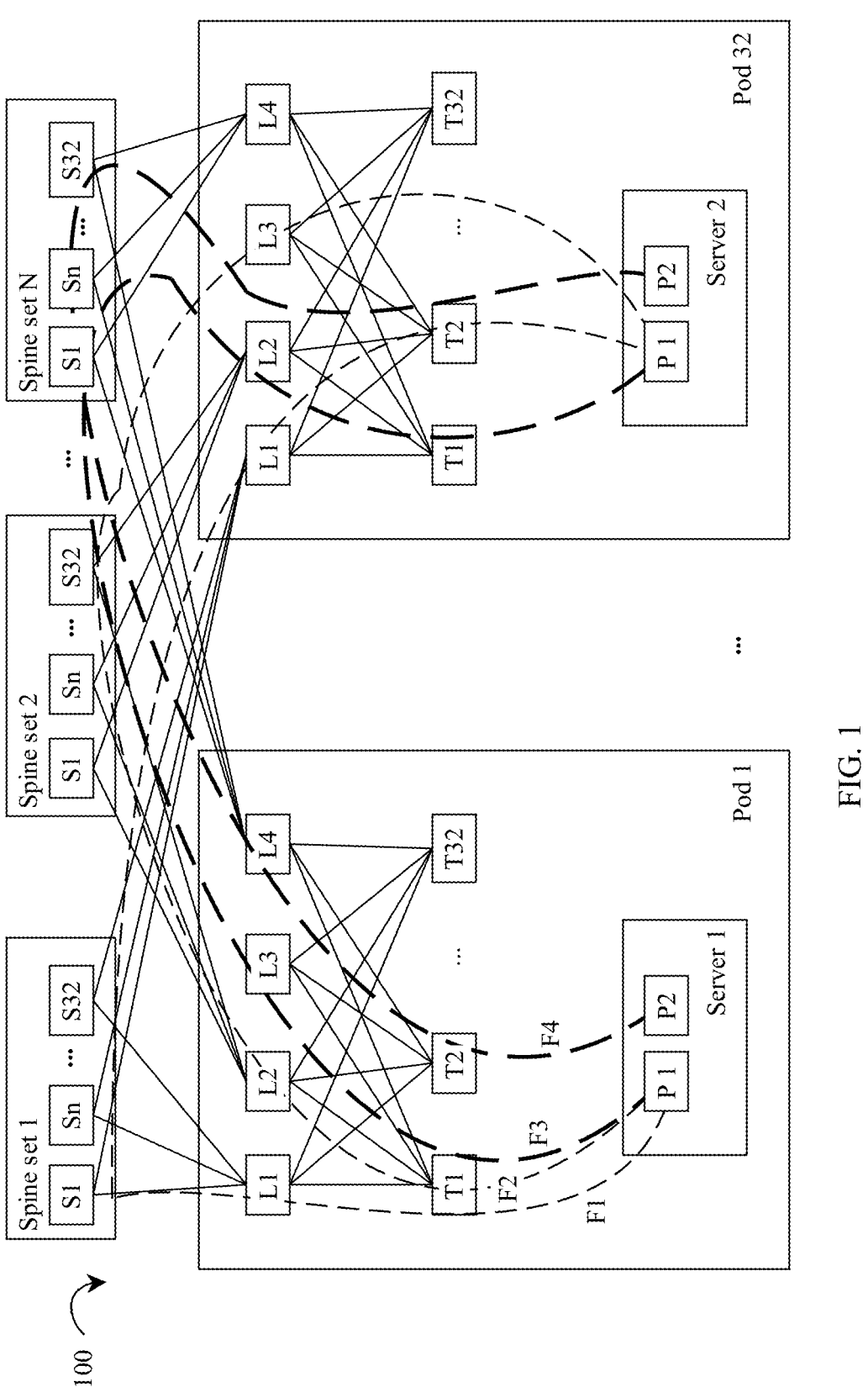
FIG. 1 is a schematic diagram of a process of forwarding a data flow by using an existing load balancing technology.

In this application, one forwarding path includes a plurality of intermediate nodes. A path F1 shown in FIG. 1 indicates a forwarding path from a server 1 in a source-end pod 1 to a server 2 in a destination-end pod 32. F1 includes a plurality of intermediate nodes, for example, a ToR node (also referred to as an uplink ToR node) T1 in the pod 1, a leaf node (also referred to as an uplink leaf node) L1 in the pod 1, a spine node S1 in a spine set 1, a leaf node (also referred to as a downlink leaf node) L1 in the pod 32, and a ToR node (also referred to as a downlink ToR node) T2 in the pod 32. F1 finally arrives at the destination server 2. A sequence of the intermediate nodes may be described in a manner of a first hop, a second hop, a third hop, . . . . In a three-layer clos networking mode, intermediate nodes include an uplink ToR node, an uplink leaf node, a spine node, a downlink leaf node, and a downlink ToR node, which respectively correspond to a first hop, a second, a third hop, a fourth hop, and a fifth hop on a forwarding path.

A server first determines a first weight between the server and a destination server; and determines a second weight between an intermediate node and the destination server, where the intermediate node is between the server and the destination server. (The process of determining the first weight and the second weight may be referred to as first path calculation.) Then, the server generates a plurality of load balancing paths based on the second weight or based on the first weight and the second weight (this process is referred to as second path calculation below). FIG. 8 shows a load balancing path list 800 generated by the server 250. The load balancing path list 800 may be stored as a table or a database. Each load balancing path in the load balancing path list 800 includes a path identifier 810, a destination server identifier 820, and addresses 830 of a plurality of hops. The path identifier 810 may be a numeric value, a character string, or a field of another type. The destination server identifier 820 may be an identifier of a destination server, an IP address of the destination server, a MAC address of the destination server, or information that can uniquely identify the destination server, for example, a hash value obtained through hash calculation based on information about the destination server.

In this application, a weight between a source server and a destination server is referred to as a first weight; and a weight between a forwarding node and the destination server is referred to as a second weight, where the forwarding node is between the source server and the destination server. In other words, a major difference between the first weight and the second weight lies in that start points of calculation are different. In this application, a second weight between each intermediate node and the destination server may be calculated, where the intermediate node is between the source server and the destination server; and the first weight between the source server and the destination node may be determined based on the second weight of each intermediate node.

Figure 7:
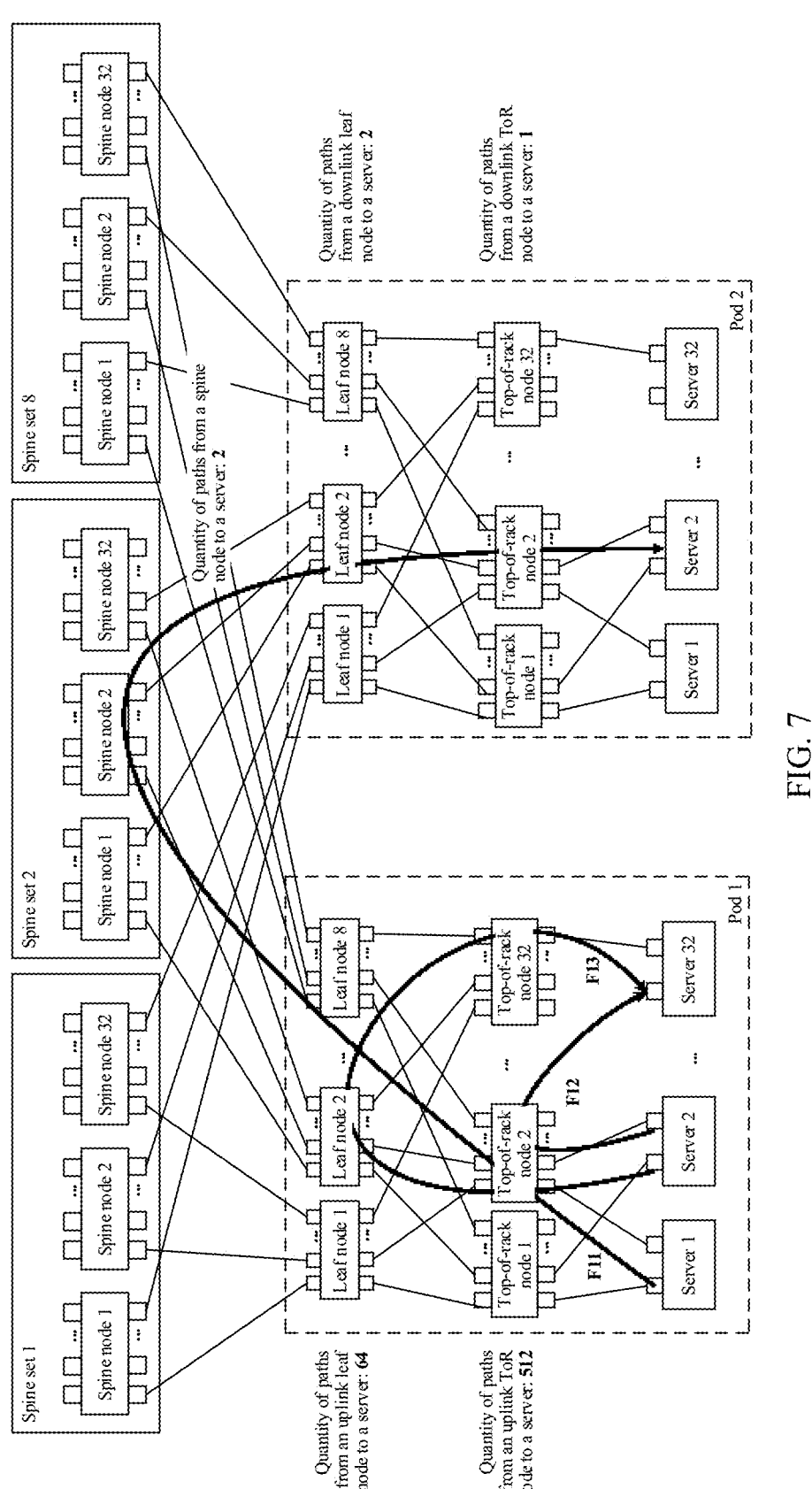
FIG. 7 is a schematic diagram of a weight of each forwarding node according to an embodiment of this application.

The following describes a process of first path calculation by using an example in which a first weight (as indicated by F11) between a source server in a pod 1 (for example, a server 1 in the pod 1) and a destination server in a pod 2 (for example, a server 2 in the pod 2) in a clos networking mode shown in FIG. 7 is calculated.

Step 1: The source server calculates, starting from the destination server by using a backpropagation (BP) algorithm, a second weight from a ToR node (also referred to as a downlink ToR node, for example, a ToR 1 and a ToR N in the pod 2) to the destination server, where the ToR node is directly connected to the destination server. The second weight may be a quantity of effective paths between the downlink ToR node and the destination server. For example, the downlink ToR node is connected to the destination server by using only one downlink port. Therefore, the quantity of effective paths from the downlink ToR node to the destination server is 1.

Step 2: The source server calculates a second weight from a leaf node (also referred to as a downlink leaf node) in the pod 2 to the destination server based on topology information. The destination server in FIG. 7 is dual-homed to two ToRs. Therefore, it can be learned that a quantity of effective paths from the downlink leaf node to the destination server is 2.

Step 3: Similar to step 2, the source server sequentially calculates second weights from a spine node, an uplink leaf node, and an uplink ToR node to the destination server based on the topology information. One spine set includes 32 spine nodes, and one pod includes eight leaf nodes and 32 ToR nodes. Therefore, it can be learned that corresponding quantities of effective paths from the spine node, the uplink leaf node, and the uplink ToR node to the destination server are respectively 2, 64, and 512. Correspondingly, in mesh networking, a spine node and a leaf node are in full connection. If a quantity and type of used forwarding nodes remain unchanged, corresponding quantities of effective paths from a spine node, an uplink leaf node, and an uplink ToR node to the destination server are respectively 16, 128, and 1024.

The source server and the uplink ToR node are connected in a one-to-one or one-to-two manner. It can be learned, based on the quantity of effective paths from the uplink ToR node to the destination server, that a quantity of effective paths from the source server to the destination server is 512 (where the source server is connected to the uplink ToR node in a one-to-one manner, or the source server is connected to a dual-homing ToR node and the dual-homing ToR node works in active-standby mode) or 1024 (where the source server is connected to a dual-homing ToR node and the dual-homing ToR node works in active-active mode), thereby obtaining the first weight. By using the foregoing steps, the first weight from the source server to the destination server is finally obtained. In addition, the first weight of the source server and the second weight of the uplink ToR node may be the same or may be different.

The first path calculation indicated by F11 in FIG. 7 is performed across pods. Similarly, the source server (the server 1 in the pod 1) may further complete first path calculation for another destination server in a same pod (for example, a server 32 in the pod 1). The two servers belong to the same pod. Therefore, traffic does not need to pass through a spine node in a spine set. During the first path calculation, a quantity of effective paths between the spine node and the server 32 does not need to be calculated. Therefore, if the server 1 and the server 32 are connected to different ToR nodes, as indicated by F13, the server 1 is connected to an uplink ToR 2 and the server 32 is connected to an uplink ToR 32, the server 1 needs to calculate only quantities of effective paths from a downlink ToR node, a downlink leaf node (where an uplink leaf node and the downlink leaf node are the same leaf node), and an uplink ToR node to the server 32, to obtain a weight from the server 1 to the server 32. If a ToR node connected to the server 1 and a ToR node connected to the server 32 are the same node, for example, the server 1 and the server 32 are both connected to an uplink ToR node 2, as indicated by F12, it is directly learned that a quantity of effective paths from the server 1 to the server 32 is 1.

Through the foregoing first path calculation, the source server may obtain first weights between the server and all other servers in the data center network.

The foregoing uses a quantity of effective paths as a weight between a source server or an intermediate node and a destination server. Optionally, the first weight may alternatively be deployed forwarding path history, network status information, or the like. The network status information includes network congestion, packet loss, port bandwidth, rerouting, and fault information. For example, a load balancing path that a forwarding node may generate in current first path calculation is determined based on a plurality of previously generated load balancing paths (forwarding path history). The second weight includes information corresponding to the first weight. As shown in FIG. 7, based on a network position (relative to a source server and different from an actual physical deployment position) at which a forwarding node is deployed, an uplink ToR node, an uplink leaf node, a spine node, a downlink leaf node, and a downlink ToR node may exist between the source server and a destination server. In this application, forwarding nodes deployed at different network positions belong to different layers. For example, for the source server, the uplink ToR node is a first-hop node, the uplink leaf node is a second-hop node, the spine node is a third-hop node, the downlink leaf node is a fourth-hop node, and the downlink ToR node is a fifth-hop node. For another example, when a source server and a destination server are located in the same pod, an uplink ToR node, a leaf node, and a downlink ToR node between the source server and the destination server are respectively a first-hop node, a second-hop node, and a third-hop node.

After obtaining a first weight between the source server and a destination server, and a second weight between each intermediate node and the destination server, a source server determines, based on the first weight, whether a plurality of load balancing paths exist between the source server and the destination server. When a plurality of load balancing paths exist, a first-hop node is selected from a plurality of first-hop nodes as a first hop of a first load balancing path based on a second weight of at least one of the plurality of first-hop nodes. The first load balancing path is any one of the plurality of load balancing paths. A second-hop node is selected as a second hop of the first load balancing path based on a second weight of at least one of a plurality of second-hop nodes, or a second-hop node is selected from the plurality of second-hop nodes as a second hop of the first load balancing path in a random, round-robin, or step-based manner. A manner of selecting a third hop to a last hop is the same as that of selecting the second hop. By using the foregoing process, the source server may generate a plurality of load balancing paths to the destination server. In an implementation, specific steps of the foregoing process are as follows:

Step 1: The source server determines, based on the first weight, whether a plurality of required load balancing paths exist between the source server and the destination server.

It is assumed that 16 load balancing paths need to be selected between the source server and the destination server. When the first weight is a quantity of paths and is greater than 16, step 2 and subsequent operations may be performed. When the first weight is less than or equal to 16, all paths between the source server and the destination server are used as load balancing paths.

Step 2: Because the source server corresponds to two uplink ToR nodes, the source server calculates a weight ratio α between the two uplink ToR nodes, and allocates a corresponding quantity β of load balancing paths to each uplink ToR node based on the weight ratio α, where the weight ratio α may be obtained according to the following formula (1):

$$\alpha = x/(x+y) \text{ or } \alpha = y/(x+y) \tag{1}$$

where x represents a second weight of a first uplink ToR of the source server, and y represents a second weight of a second uplink ToR of the source server.

The quantity β of load balancing paths allocated to each uplink ToR may be obtained according to the following formula (2):

$$\beta = \alpha \times N \tag{2}$$

where N represents a total quantity of load balancing paths that need to be generated.

As shown in FIG. 7, the server 1 in the pod 1 is connected to a ToR 1 and a ToR N respectively through a port P11 and a port P12. The ToR 1 and the ToR N form a dual-homing ToR of the server 1, and weights, for example, quantities of effective paths, from the ToR 1 and the ToR N to the destination server are both 512. It is assumed that a total quantity N of load balancing paths that the server 1 in the pod 1 needs to generate is 16. In other words, to implement load balancing, 16 balancing paths need to be generated for use by a data flow. Under a normal network condition, it is calculated according to formula (1) that:

$$\alpha_{ToR1} = 512/(512+512) = 0.5$$

$$\alpha_{ToRN} = 512/(512+512) = 0.5$$

It is calculated according to formula (2) that:

$$\beta_{ToR1} = 16 \times \alpha_{ToR1} = 8$$

$$\beta_{ToRN} = 16 \times \alpha_{ToRN} = 8$$

To be specific, the ToR 1 and the ToR N each serve as first hops of eight load balancing paths.

When a forwarding node in a data center network is faulty, it is assumed that half of uplink ports of an uplink ToR N are faulty, to be specific, a quantity of effective paths between the uplink ToR N and the destination server is changed from 512 to 256. According to formula (1):

Weight ratio $\alpha_{ToR1}$ of an uplink ToR 1=512/(512+256)=2/3, and

Weight ratio $\alpha_{ToRN}$ of an uplink ToR N=256/(512+256)=1/3.

According to formula (2):

Quantity $\beta_{ToR1}$ of load balancing paths including the uplink ToR 1=16×$\alpha_{ToR1}$≈11, and Quantity $\beta_{ToRN}$ of load balancing paths including the uplink ToR N=16×$\alpha_{ToR3}$≈5.

In other words, among the 16 load balancing paths, first hops of 11 load balancing paths are the uplink ToR 1, and first hops of five load balancing paths are the uplink ToR N. Node identifiers of the ToR 1 and the ToR N may be filled into first-hop addresses on corresponding load balancing paths based on the quantities of load balancing paths of the uplink ToR 1 and the uplink ToR N that are obtained through calculation. An identifier of a node may be an ID of the node, an IP address of the node, a MAC address of the node, or an identifier of a port connected to the node, for example, an egress port of a server connected to the node. As shown in FIG. 8, an egress port identifier P11 of a server may be filled into a first-hop address of a load balancing path 1 in addresses 830 of a plurality of hops, and an egress port identifier P12 may be filled into a first-hop address of a load balancing path 15. It should be noted that in FIG. 8, as an example for description, first-hop addresses of load balancing paths 1, 2, and 14 in the addresses 830 of a plurality of hops are respectively a port identifier, an IP address, and a MAC address. This is merely intended for illustrative description. In an implementation process, usually a same type of identifiers is used for description. This is not limited in this application.

Step 3: Determine a second hop of the first load balancing path. The second hop of the first load balancing path may be determined in a plurality of manners. For example, a second-hop node may be selected as the second hop of the first load balancing path based on a second weight of at least one of a plurality of second-hop nodes, or a second-hop node is selected from the plurality of second-hop nodes as the second hop of the first load balancing path in a random, round-robin, or step-based manner. In an implementation, as shown in FIG. 9, the server 1 randomly selects a node from a deployable forwarding node set as a start point (start). An identifier of the node is used as a second-hop address of the first load balancing path. The deployable forwarding node set is an effective node list of ToR nodes, leaf nodes, or spine nodes. Using an uplink leaf node in FIG. 7 as an example, when the first load balancing path is generated, the server 1 randomly selects a leaf node from eight uplink leaf nodes as the second hop of the first load balancing path. It is assumed that a leaf node 5 is selected. When a second load balancing path (also referred to as a second load balancing path) is generated, the source server selects a leaf node 7 as a second hop of the second load balancing path by using a step (step, assuming that step=2) as an offset.

Step 4: Similar to step 2, select a spine node, for example, a spine node 2, as a third hop of the first load balancing path in a random or step-based manner; and select a spine node 4 as a third hop of the second load balancing path based on a step of 2.

Step 5: Select a fourth hop of the first load balancing path and a fourth hop of the second load balancing path based on different networking modes. In mesh networking, an uplink leaf node and a spine node are in full connection. Therefore, a downlink leaf node may be selected as a fourth hop of the first load balancing path and a downlink leaf node may be selected as a fourth hop of the second load balancing path also in a random or step-based manner. However, in clos networking, a leaf node and a spine node are in group connection. Therefore, the third hop of the first load balancing path already determines an identifier of a fourth-hop downlink leaf node of the first load balancing path. For example, it is assumed that the third hop of the first load balancing path is a spine node 2 in a spine set 2, and a downlink leaf node 2 is connected to the spine node 2. It may be determined, based on the topology information, that the fourth hop of the first load balancing path is the downlink leaf node 2. A fourth-hop address of the second load balancing path may be determined based on the same method.

Step 6: Similar to step 2 and step 3, select a downlink ToR node as a fifth hop of the first load balancing path and select a downlink ToR node as a fifth hop of the second load balancing path in a random or step-based manner.

Based on the foregoing process, the server 1 determines the intermediate nodes of the first load balancing path and generates the first load balancing path.

Calculation of the remaining 15 load balancing paths can be completed by repeating the foregoing process. Finally, the server 1 generates the plurality of load balancing paths to the destination server, as shown in FIG. 8.

The server 1 may generate a plurality of load balancing paths to another destination server in a similar manner.

In an implementation, a server may generate a plurality of load balancing paths between the server and another server at different moments based on a scale of a data center network. For example, when the scale of the data center network is small, the server may generate a plurality of load balancing paths between the server and each of other servers before receiving a data flow and after receiving topology information of the data center network sent by a controller. When the scale of the data center network is relatively large, when receiving a data flow, the server may generate, based on a destination address in the data flow, a plurality of load balancing paths to a server corresponding to the destination address.

In an implementation, in step S404, the server obtains a data flow, selects a forwarding path corresponding to the data flow from the load balancing path list shown in FIG. 8, and forwards the data flow. Assuming that an identifier of a destination server of the data flow is 1, load balancing paths whose path identifiers are 1 and 2 are found, based on the identifier of the server, from the load balancing path list shown in FIG. 8. The obtained data flow is segmented, to obtain a plurality of flow segments. The flow segments are sent to the load balancing paths whose path identifiers are 1 and 2 in a round-robin (RR) or random manner or the like. In an implementation, the server may send the flow segments to all load balancing paths corresponding to the data flow that are stored in the load balancing list, or may send the flow segments to several load balancing paths selected from all load balancing paths corresponding to the data flow. In an implementation, the server may segment the data flow in a flowlet manner, to obtain a plurality of flow segments. The server may segment the data flow by recognizing a time difference between consecutive packets of the data flow. For example, the server 250 may set a parameter $\pi$ When a difference between arrival times of two consecutive packets of the data flow reaches a value of $\pi$, for example, 50 microseconds ($\mu$s), it may be considered that the two consecutive packets respectively belong to two flow segments, and forwarding the two flow segments through different forwarding paths does not cause a packet disorder.

In an implementation, as shown in FIG. 11, a server (assuming that an IP address of the server is ip0) may send a flow segment to a destination server (assuming that an IP address of the server is ip6) through a selected load balancing path 1110 by using an SRv6-TE technology. Segment routing (SR) is a source-based routing mechanism, in which controllable label allocation is introduced into an IP network or an MPLS network to provide a traffic guidance capability for the network. There are two SR methods: one is MPLS-based segment routing (SR-MPLS), and the other is IPv6-based segment routing (SRv6). In SRv6, a routing extension header (Routing Extension Header) defined in an IPv6 standard is used to carry a newly defined segment routing header (SRH). The SRH specifies an explicit IPv6 path and carries an IPv6 segment list (SL). The SRH is used to support an SR node in accessing a packet header, updating a pointer, exchanging a destination address, and performing forwarding. It is assumed that an intermediate node corresponding to the load balancing path 1110 is an SR node, and a related tunnel has been deployed through traffic engineering (TE). The server encapsulates the flow segment (assuming that the flow segment is an IPv6 packet), adds an SRH after a header of the IPv6 packet, pushes an address of an intermediate node of the load balancing path 1110 into a segment list field of the SRH, and sets an SL value to 5 based on a quantity of intermediate nodes of the load balancing path 1110, as shown in a packet 1120 in FIG. 11. When the packet 1120 is forwarded on forwarding nodes corresponding to the load balancing path 1110, the SL value of the packet decreases by 1 each time the packet passes through one forwarding node, until the packet finally arrives at the destination server.

In an implementation, in a data flow forwarding process, when a forwarding node is faulty, for example, a spine node, a leaf node, or a ToR node is faulty, a data flow that is originally forwarded by using the faulty forwarding node is switched to another forwarding node, to ensure normal forwarding of the data flow. In an implementation, when a node is faulty, a server does not need to regenerate a load balancing path, and only needs to change, in an originally generated load balancing path, an address of a hop to which the faulty node belongs to an address of another normal node. For example, when a second-hop node (assuming that the node is a node L5) in the load balancing path 1110 shown in FIG. 11 is faulty, after the server receives a notification indicating that the node L5 is faulty, the server may select, based on a layer at which the faulty node is located (for example, L5 is a leaf node), a leaf node L7 as a second-hop address of the load balancing path 1110 based on a step-based manner (assuming that step=2) in second path calculation; and modify all other load balancing paths related to the node L5.

After a quantity of faulty nodes related to a server reaches or exceeds M, when one of the M faulty nodes recovers to normal, the server regenerates a plurality of new load balancing paths based on new topology information of the data center network. In the load balancing system 200, the topology information of the data center network includes node status change information, for example, an event indicating that a node is faulty or an event indicating that a faulty node recovers to normal. These events may be sent separately, or may be sent together with other topology information of the DCN. The controller continuously collects the topology information of the data center network; and when the topology information is updated or a specified condition is met, sends the updated topology information to a server.

The foregoing load balancing paths generated based on calculation are mainly used for forwarding data flows of a normal service in the data center network. These data flows of the normal service may exhaust a related capability, for example, bandwidth, of passed forwarding nodes of original load balancing paths because of service load. In this case, if the load balancing system 200 suddenly receives a burst (burst) flow, for example, a virtual machine deployed on the server 250 needs to be migrated to another server, if the original load balancing paths are still used for data forwarding in this case, the original normal service is congested and affected. Therefore, in an implementation, when the server 250 recognizes that a data flow is a burst flow, for example, when it is recognized, by using a flowlet mechanism, that several consecutive adjacent flow segments all belong to a same flow, the flow may be considered as a burst flow, the server 250 regenerates S (S≥1) incremental balancing paths based on the topology information of the data center network through first path calculation and second path calculation described above, and forwards the received burst flow through the S incremental load balancing paths. For example, when S is greater than 1, the server 250 segments the burst flow to obtain a plurality of flow segments, and sends the flow segments to the S incremental load balancing paths in a round-robin or random manner or the like. When determining that forwarding of the burst flow is completed, the server 250 may delete the S load balancing paths. The burst flow is forwarded by using the incremental load balancing paths. On the one hand, this ensures that the normal service carried by the plurality of original load balancing paths is not affected when the burst flow arrives. On the other hand, the incremental balancing paths are deleted after use, saving resources of the data center network.

The foregoing describes the load balancing method provided in this embodiment of this application. It can be understood that, to implement the foregoing functions, a server in embodiments of this application includes a corresponding hardware structure and/or software module for executing each function. A person skilled in the art should be easily aware that functions and steps in the examples described in embodiments disclosed in this application can be implemented in a form of hardware, a combination of hardware and computer software, or the like. Whether a function is performed by hardware or hardware driven by computer software depends on particular applications and design constraint conditions of the technical solutions. A person skilled in the art may use different methods to implement the described functions, but it should not be considered that the implementation goes beyond the scope of this application.

Figure 5:
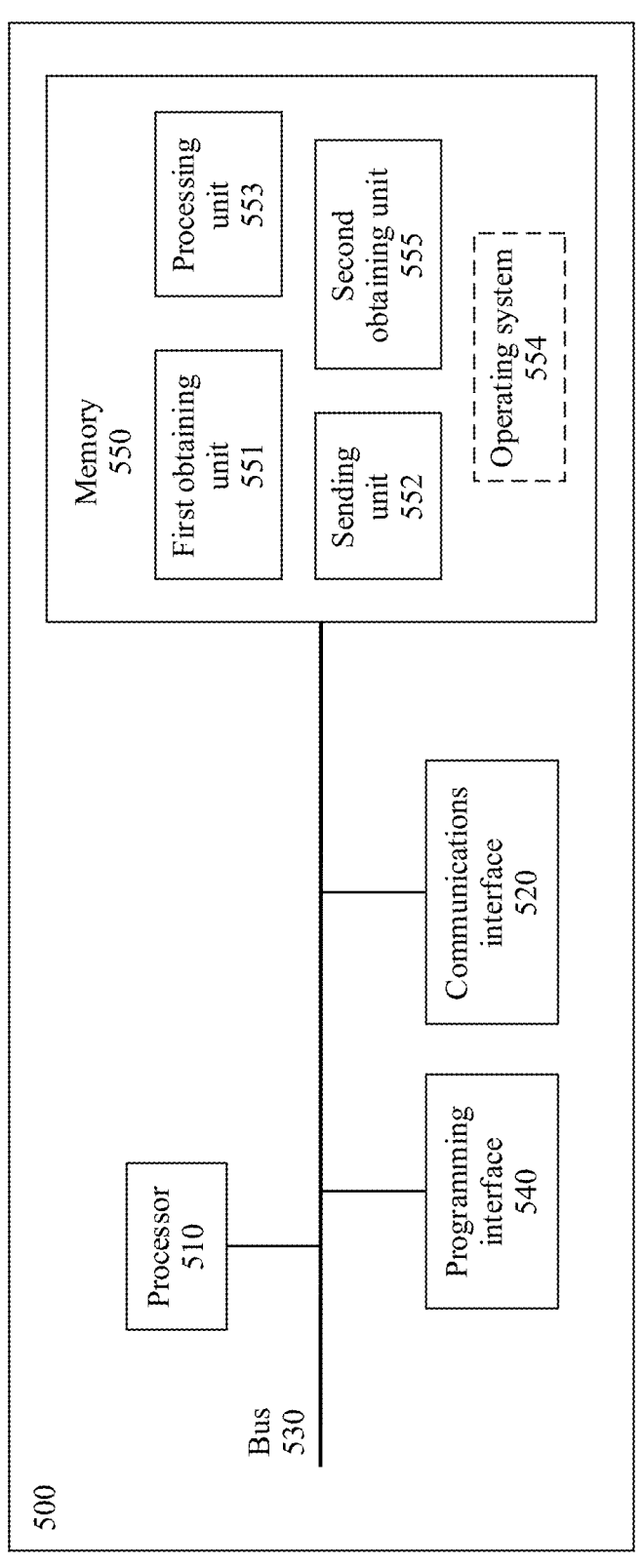
FIG. 5 is a schematic diagram of a structure of a server according to an embodiment of this application.

The following describes a structure of a server 250 in this application from different perspectives. In this application, FIG. 5 is a schematic diagram of a structure of an implementation (referred to as a server 500) of the server 250. The server 500 includes a processor 510, a communications interface 520, a programming interface 540, and a memory 550. The processor 510, the communications interface 520, the programming interface 540, and the memory 550 communicate with each other through a bus 530. The bus may be a peripheral component interconnect (PCI) bus, an extended industry standard architecture (EISA) bus, a peripheral component interconnect express (PCIE), or the like. The communications bus may be classified into an address bus, a data bus, a control bus, and the like. For ease of representation, only one thick line is used to represent the bus in the figure, but this does not mean that there is only one bus or only one type of bus. The communications interface 520 is used by the server to communicate with another device, for example, a ToR node 220 and a controller 210. The memory 550 may include a random access memory (RAM), and may further include a non-volatile memory (NVM). The memory 550 is configured to store program code. The program code includes instructions that can implement functions of a first obtaining unit 551, a sending unit 552, a processing unit 553, and a second obtaining unit 555. The memory 550 may further store received topology information of a data center network. The memory 550 may further include an operating system 554. The processor 510 may invoke the code in the memory 550 directly or by using the operating system 554, so that the server 500 can implement the functions of the first obtaining unit 551, the sending unit 552, the processing unit 553, and the second obtaining unit 555. The first obtaining unit 551 is configured to obtain the topology information of the data center network, where the topology information may be sent by the controller, may be sent by another network node, or may be generated by the server 500. The second obtaining unit 555 is configured to obtain a data flow. The data flow may be a data flow generated by the server 500, or may be a data flow sent by an external node through the communications interface 520. The processing unit 553 is configured to generate a plurality of load balancing paths by using steps such as first path calculation and second path calculation based on the received topology information of the data center network. The processing unit 553 may be further configured to recognize a burst flow, generate an incremental load balancing path to forward the burst flow, and delete the incremental load balancing path after sending of the burst flow is completed. The sending unit 552 is configured to forward the data flow, for example, may segment the data flow to obtain a plurality of flow segments, and send the flow segments to the load balancing paths in a round-robin or random manner or the like. The programming interface 540 is configured to write the program code into the memory 550. The components of the server 500 provided in this embodiment of this application are merely examples. A person skilled in the art may add or remove a component as needed, or may split functions of one component so that the functions are implemented by using a plurality of components.

Figure 6:
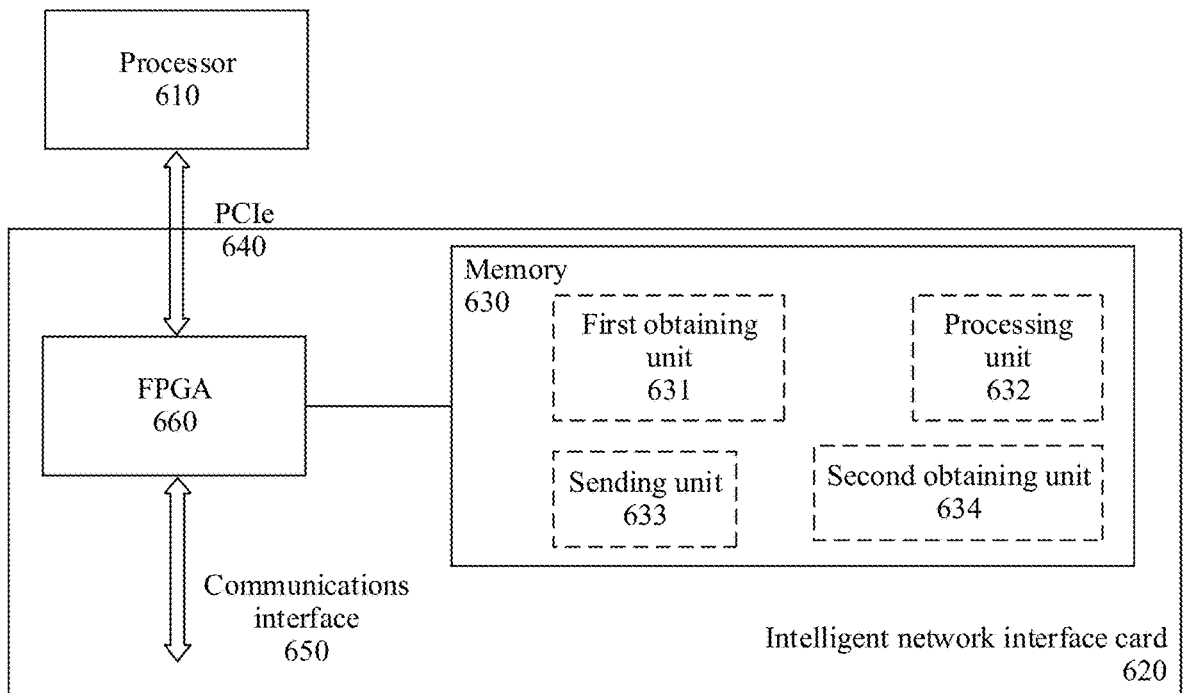
FIG. 6 is a schematic diagram of a structure of an intelligent network interface card according to an embodiment of this application.

In another implementation, as shown in FIG. 6, a server 250 in this application includes an intelligent network interface card 620. The intelligent network interface card 620 includes an FPGA 660 and a memory 630. The memory 630 is configured to store program code. The program code includes instructions that can implement functions of a first obtaining unit 631, a sending unit 633, a processing unit 632, and a second obtaining unit 634. The first obtaining unit 631 is configured to obtain topology information of a data center network, where the topology information may be sent by a controller, may be sent by another network node, or may be generated by the server 250. The topology information of the data center network obtained by the first obtaining unit 631 may be stored in the memory 630 of the intelligent network interface card 620, or may be stored in another memory of the server 250. In an implementation, the second obtaining unit 634 is configured to obtain a data flow generated by the server 250. The data flow is transmitted to the intelligent network interface card 620 through a PCIe interface 640, and is then sent by the sending unit 633 to an external node through a communications interface 650. In another implementation, the second obtaining unit 634 may further obtain a data flow sent by an external node. The data flow sent by the external node is transmitted to the intelligent network interface card 620 through a communications interface 650, processed by a processor 610 or the FPGA 660 of the server 250, and then forwarded by the sending unit 633 to the external node again through the communications interface 650. The processing unit 632 is configured to generate a plurality of load balancing paths by using steps such as first path calculation and second path calculation based on the received topology information of the data center network. The processing unit 632 may be further configured to recognize a burst flow, generate at least one incremental load balancing path, and delete the incremental load balancing path after sending of the burst flow is completed. The sending unit 633 is configured to send a segmented data flow to the load balancing paths through the communications interface. The FPGA 660 invokes the code in the memory 630 to implement the functions of the first obtaining unit 631, the sending unit 633, the processing unit 632, and the second obtaining unit 634. The processor 610 of the server 250 is connected to the intelligent network interface card 620 through the PCIe interface 640. When the topology information of the data center network is stored in a memory outside the intelligent network interface card 620, the FPGA 660 may query the topology information of the data center network by using the processor 610 through the PCIe interface 640, and generate load balancing paths by using the processing unit 632. The server 250 writes program code through a programming interface 540, and writes the program code into the memory 630 by using the processor 610 through the PCIe interface 640. The components of the intelligent network interface card 620 provided in this embodiment of this application are merely examples. A person skilled in the art may add or remove a component as needed, or may split functions of one component so that the functions are implemented by using a plurality of components.

Figure 12:
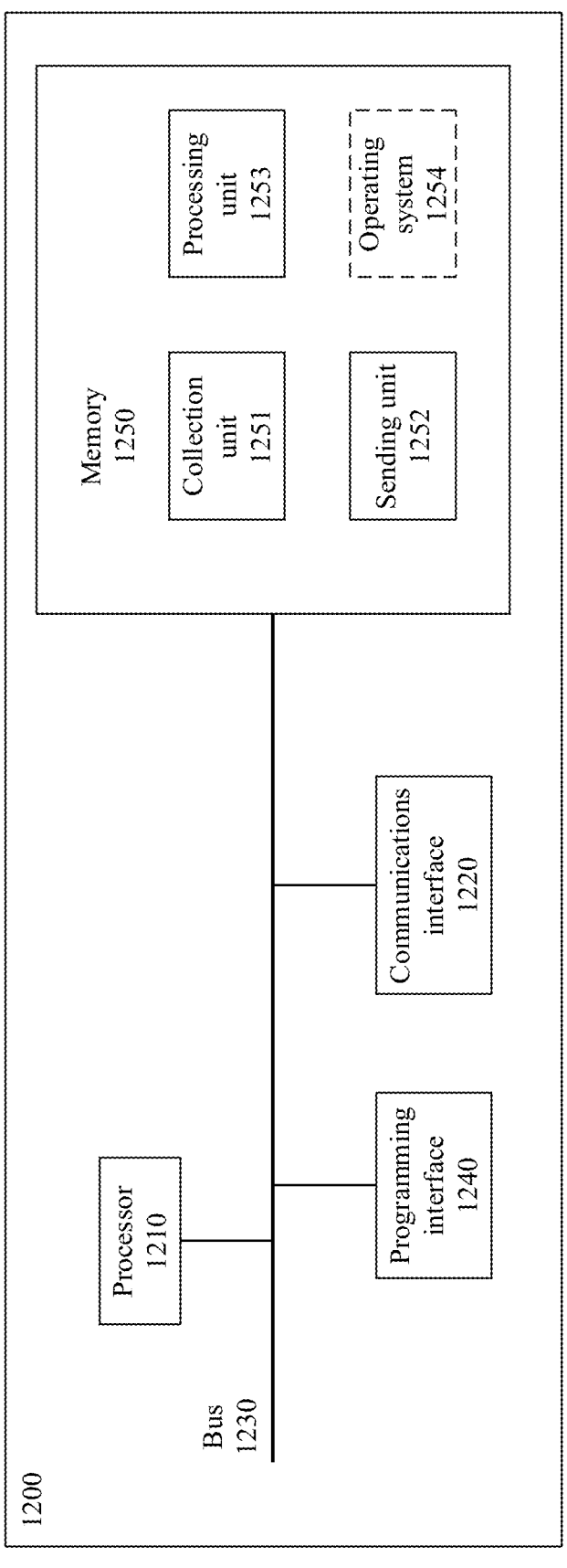
FIG. 12 is a schematic diagram of a structure of a controller according to an embodiment of this application.

The following describes a structure of a controller in this application. In this application, FIG. 12 is a schematic diagram of a structure of a controller 1200. The controller 1200 includes a processor 1210, a communications interface 1220, a programming interface 1240, and a memory 1250. The processor 1210, the communications interface 1220, the programming interface 1240, and the memory 1250 communicate with each other through a bus 1230. The bus may be a peripheral component interconnect PCI bus, an EISA bus, a PCIe bus, or the like. The communications bus may be classified into an address bus, a data bus, a control bus, and the like. For ease of representation, only one thick line is used to represent the bus in the figure, but this does not mean that there is only one bus or only one type of bus. The communications interface 1220 is configured to communicate with a controller 1200 and another network device, for example, a layer forwarding node or a server. The memory 1250 may be a RAM, an NVM, or the like. The memory 1250 is configured to store program code of the controller. The program code includes instructions that can implement functions of a collection unit 1251, a sending unit 1252, and a processing unit 1253. The memory 1250 may further include an operating system 1254. The processor 1210 may invoke the code in the memory 1250 directly or by using the operating system 1254, to implement the functions of the collection unit 1251, the sending unit 1252, and the processing unit 1253. The collection unit 1251 is configured to collect information about a network node in a data center network. The network node includes a server. The processing unit 1253 is configured to generate topology information of the DCN based on the collected information. The sending unit 1252 is configured to send, to a server 250, the topology information of the DCN generated by the processing unit 1253. The programming interface 1240 is configured to write the program code into the memory 1250. The components of the controller 1200 provided in this embodiment of this application are merely examples. A person skilled in the art may add or remove a component as needed, or may split functions of one component so that the functions are implemented by using a plurality of components.

An embodiment of this application further provides a computer-readable storage medium, configured to store program code for implementing the foregoing load balancing method. Instructions included in the program code are used to execute the method procedure in any one of the foregoing method embodiments. The foregoing storage medium includes any non-transitory (non-transitory) machine-readable medium capable of storing program code, such as a USB flash drive, a removable hard disk, a magnetic disk, an optical disc, a random access memory (RAM), a solid state drive (SSD), or a non-volatile memory (non-volatile memory).

It should be noted that embodiments provided in this application are merely examples. A person skilled in the art may be clearly aware that for convenience and conciseness of description, in the foregoing embodiments, embodiments emphasize different aspects, and for a part not described in detail in one embodiment, reference may be made to related description of another embodiment. Embodiments of this application, claims, and features disclosed in the accompanying drawings may exist independently, or exist in a combination. Features described in a hardware form in embodiments of this application may be executed by software, and vice versa. This is not limited herein.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A load balancing method performed by a server configured to calculate end-to-end load balanced paths in a data center network to determine a plurality of load balanced paths within a data center network (DCN) to reduce congestion at downstream nodes, the method comprising:

obtaining, via a communications interface, topology information of a plurality of nodes disposed at different layers of the data center network (DCN), wherein the topology information comprises an identifier of a network node in the data center network and a connection relationship between the network node and a neighboring node in the data center network;

obtaining a data flow path within the DCN;

receiving loading or congestion information via a link layer discovery protocol (LLDP) for a plurality of nodes in the DCN;

perform load balancing analysis for communications within the DCN based upon the loading of congestion information to determine the plurality of load balanced paths that considers node information for nodes disposed at the different layers within the DCN; and selecting a forwarding path corresponding to the data flow from the plurality of load balancing paths to improve load balancing efficiency in the DCN to reduce congestion for at least one downstream node at a layer beyond a next hop.

2. The method according to claim 1, further comprising:

determining the plurality of load balancing paths based on the topology information, and wherein the step of selecting the forwarding path comprises:

segmenting the data flow to obtain a plurality of flow segments; and selecting, from the plurality of load balancing paths, a corresponding forwarding path for each of the plurality of flow segments.

3. The method according to claim 1, further comprising: determining a first weight between the server and a destination server based on the topology information, wherein the first weight is for determining the plurality of load balancing paths.

4. The method according to claim 3, wherein the step of determining the first weight between the server and the destination server comprises:

calculating a second weight between an intermediate node and the destination server by using a backpropagation algorithm, wherein the intermediate node is located between the server and the destination server; and determining the first weight between the server and the destination server based on the second weight of the intermediate node.

5. The method according to claim 4, wherein the intermediate node comprises a plurality of first-hop nodes connected to the server, and a plurality of second-hop nodes, and wherein the step of determining the plurality of load balancing paths comprises:

selecting a first-hop node from the plurality of first-hop nodes as a first hop of a first load balancing path based on a second weight of at least one of the plurality of first-hop nodes, wherein the first load balancing path is one of the plurality of load balancing paths; and selecting a second-hop node as a second hop of the first load balancing path based on a second weight of at least one of the plurality of second-hop nodes, or selecting a second-hop node from the plurality of second-hop nodes as a second hop of the first load balancing path in a random, round-robin, or step-based manner.

6. The method according to claim 4, wherein the first weight comprises path history information, network status information, or a quantity of connected effective paths between the server and the destination server, and the network status information comprises network congestion, packet loss, port bandwidth, rerouting, or fault information, and the second weight comprises information corresponding to the first weight.

7. The method according to claim 1, further comprising: detecting that a faulty network node recovers to normal after a quantity of faulty network nodes in the data center network reaches or exceeds a threshold; and regenerating a load balancing path based on updated topology information of the data center network.

8. The method according to claim 7, wherein the updated topology information of the data center network comprises node status change information, and the node status change information comprises information indicating that a network node in the data center network is faulty or information indicating that a faulty network node in the data center network recovers to normal.

9. The method according to claim 1, further comprising: detecting a burst flow;

generating an incremental load balancing path based on the topology information; and sending the burst flow based on the incremental load balancing path.

10. The method according to claim 9, further comprising: deleting the incremental load balancing path after completion of sending the burst flow.

11. The method according to claim 1, wherein the step of obtaining the topology information of the data center network comprises:

receiving the topology information from a controller in the data center network.

12. The method according to claim 11, wherein the information about the network node comprises information about the server, and the information about the server is sent to the controller by using a first-hop node connected to the server.

13. A server configured to calculate end-to-end load balanced paths that performs load balancing to determine a plurality of load balanced paths within a data center network (DCN) to reduce congestion at downstream nodes, in a data center network, comprising:

a memory storing executable instructions;

a processor configured to execute the executable instructions to:

obtain, via a communications interface, topology information of a plurality of nodes disposed at different layers in a data center network (DCN), wherein the topology information comprises an identifier of a network node in the data center network and a connection relationship between the network node and a neighboring node in the data center network;

obtain a data flow path within the DCN;

receiving loading or congestion information via a link layer discovery protocol (LLDP) for a plurality of nodes in the DCN;

generate a plurality of load balancing paths based on the topology information;

perform load balancing analysis for communications within the DCN based upon the loading of congestion information to determine the plurality of load balanced paths that considers node information for nodes disposed at the different layers within the DCN; and select, from the plurality of load balancing paths, a forwarding path corresponding to the data flow to improve load balancing efficiency in the DCN to reduce congestion for at least one downstream node at a layer beyond a next hop.

14. The server according to claim 13, wherein the server comprises an intelligent network interface card, and processor is located in the intelligent network interface card.

15. The server according to claim 13, wherein the processor is configured to select the forwarding path by:

segmenting the data flow to obtain a plurality of flow segments; and selecting from the plurality of load balancing paths a corresponding forwarding path for each of the plurality of flow segments.

16. The server according to claim 13, wherein the processor is further configured to: determine a first weight between the server and a destination server and determine the plurality of load balancing paths based on the first weight.

17. The server according to claim 16, wherein the processor is configured to determine the first weight by:

calculating a second weight of an intermediate node between the server and the destination server by using a backpropagation algorithm; and determine the first weight between the server and the destination server based on the second weight of the intermediate node.

18. The server according to claim 17, wherein the intermediate node comprises a plurality of first-hop nodes connected to the server, and a plurality of second-hop nodes connected to each first-hop node, and wherein the processor is configured to generate the plurality of load balancing paths by:

selecting a first-hop node from the plurality of first-hop nodes as a first hop of a first load balancing path based on a second weight of at least one of the plurality of first-hop nodes, wherein the first load balancing path is one of the plurality of load balancing paths; and selecting a second-hop node as a second hop of the first load balancing path based on a second weight of at least one of the plurality of second-hop nodes, or selecting a second-hop node from the plurality of second-hop nodes as a second hop of the first load balancing path in a random, round-robin, or step-based manner.

19. The server according to claim 17, wherein the first weight comprises path history information, network status information, or a quantity of connected effective paths between the server and the destination server, and the network status information comprises network congestion, packet loss, port bandwidth, rerouting, or fault information, and the second weight comprises information corresponding to the first weight.

20. A load balancing system configured to determine a plurality of load balanced paths within a data center network (DCN) to reduce congestion at downstream nodes, comprising:

a server in a data center network; and a controller in the data center network, wherein the server is configured to:

obtain topology information of a data center network (DCN) of a plurality of nodes disposed at different layers, wherein the topology information comprises an identifier of a network node in the data center network and a connection relationship between the network node and a neighboring node in the data center network;

obtain a data flow path within the DCN;

receive loading or congestion information via a link layer discovery protocol (LLDP) for a plurality of nodes in the DCN;

generate a plurality of load balancing paths based on the topology information;

perform load balancing analysis for communications within the DCN to determine the plurality of load balanced paths that considers node information for nodes disposed at the different layers within the DCN; and select, from the plurality of load balancing paths to improve load balancing efficiency in the DCN, a forwarding path corresponding to the data flow to reduce congestion for at least one downstream node at a layer beyond a next hop; and wherein the controller is configured to:

collect information about a network node in the data center network;

generate topology information of the data center network based on a topology model parameter and the information about the network node, wherein the topology information comprises an identifier of the network node in the data center network and a connection relationship between the network node and a plurality of downstream nodes disposed at different layers in the data center network; and send the topology information to the server.

* * * * *